Oct. 28, 1930.   H. GROB   1,779,970
DEVICE FOR PUSHING OVER A LEVER UPON REVERSAL
IN THE DIRECTION OF ROTATION OF A SHAFT
Filed Aug. 2, 1928
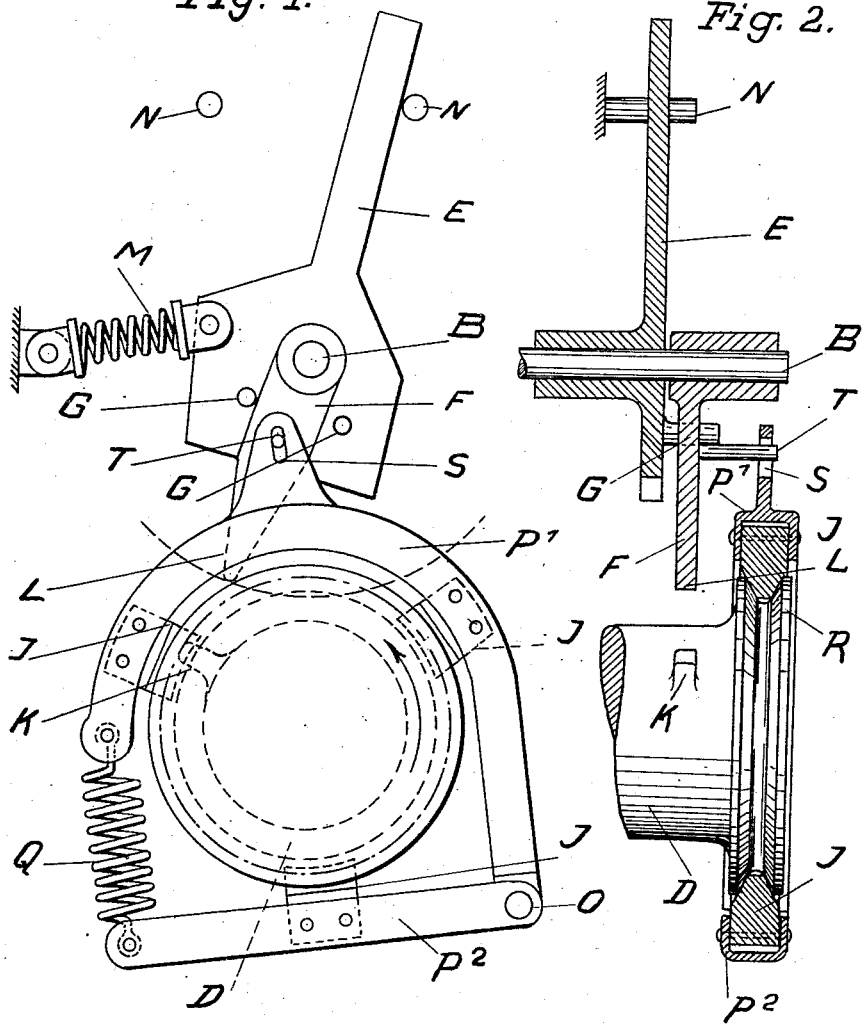
Hugo Grob
Inventor:
By Robert S. Blair
his Attorney Patented Oct. 28, 1930

1,779,970

UNITED STATES PATENT OFFICE

HUGO GROB, OF BERLIN, GERMANY

DEVICE FOR PUSHING OVER A LEVER UPON REVERSAL IN THE DIRECTION OF ROTATION OF A SHAFT

Application filed August 2, 1928, Serial No. 296,954, and in Germany August 5, 1927.

This invention relates to position reversing mechanism and more particularly to a device for causing a member to move between predetermined positions upon the reversal of the direction of rotation of a shaft with which said member is in coactive relationship.

One of the objects thereof is to provide simple, practical and efficient mechanism of the character described. Another object is to provide mechanism of the nature described wherein a change in the direction of rotation of the shaft immediately prepares certain parts of the apparatus to be positively and dependably actuated by the shaft.

A further object is to provide practical and efficient means for preventing change of position of the part to be shifted except through the reversal of the direction of rotation of the shaft. Another object is to provide in mechanism of the above character a simple and practical frictionally actuated translating device which will be substantially free from vibration, in which lateral displacement is prevented and which will be free from binding contact with the part to which motion is transmitted.

Other objects will be in part obvious and in part pointed out hereinafter.

The invention accordingly consists in the features of construction, combinations of elements, and arrangements of parts which will be exemplified in the apparatus hereinafter described and the scope of the application of which will be indicated in the following claims.

In the accompanying drawings, in which is shown one of the various possible embodiments of this invention:

Fig. 1 is a side view of my device as seen from the end of the rotative shaft.

Fig. 2 is a cross sectional view taken at right angles to Fig. 1.

Before proceeding with a detailed description of my reversing mechanism, it should be noted that heretofore, in devices of this character, where friction devices have been employed to actuate a member of the character described herein, the friction serving to shift the auxiliary member has been applied laterally through the action of a spring. This arrangement has the disadvantage that, by reason of the side pressure of the spring, a clamping effect is produced, which obstructs the non-positive displacement of the actuated member. In applicant's device this axial pressure is eliminated by reason of the fact that no pressure is applied in the direction of the axis of the shaft but at its periphery, where the pressure forces are counter-balanced centrally.

Referring to the drawings, D is a rotary shaft and E a lever which is to be shifted between two points of rest N and N, upon the reversal in the direction of rotation of D, said lever being rigidly mounted upon shaft B for pivotal movement. F is an auxiliary member having pivotal movement about shaft B and adapted in its movement to come in contact with either one of two pins G fixed upon the lever E to cause shifting of the latter. This auxiliary member has a lower extension L which in certain positions of F extends into the path of rotation of a projection K extending outwardly from the surface of the shaft D.

A friction member is mounted upon the shaft D and comprises a two part frame $P^1$, $P^2$, composed of light metal and furnished with a hinge or joint O. In the upper half $P^1$ are two friction shoes J, and in the lower half $P^2$, one friction shoe J, preferably composed of carbon. A spring Q resiliently draws the two parts of the frame together about the shaft, thus securing the pressure needed to give proper frictional contact between the shaft D and the shoes J. In order to avoid lateral displacement of the friction member on the shaft, the friction track is constructed in the form of a wedge shaped channel formed in an enlargement R of the shaft. To the shape of this wedge shaped channel the friction shoes J conform.

The distribution of the forces creating the frictional pressure at the two upper shoes J and at the lower shoe J respectively of the frictional device $P^1$, $P^2$, constitutes an important feature of the invention. The direction of force applied to the lower shoe J is normal to a line joining the two upper shoes. This symmetrical distribution of the forces causing frictional contact respectively between the upper and lower halves of the frame P¹, P² and the shaft, tends to minimize the vibration of the friction device P¹, P² normally resulting from its slight periodical lifting through adherence to the shaft, and ensures steady operation of the apparatus.

It is to be noted that the auxiliary lever F is limited in its swinging movement about the shaft B by the two pins G, G, and that it may move freely between the pins G and G without imparting motion to the lever E. As the shaft rotates the frame P¹, P² tends, as a result of the frictional force existing between the shoes J and the grooved portion R of the shaft, to rotate toward the left or the right, depending upon the direction of rotation of the shaft. This motion is imparted to the auxiliary lever F by means of the slot S and the pin T coacting therewith. These conjointly move the auxiliary member F until stopped by contact with a pin G. During this movement the end L of the lever F is brought down into the path of the projection K. When in the rotation of the shaft the projection K comes in contact with the end L, the lever F is further shifted in the direction of its initial movement, carrying with it the lever E. A spring M secured in toggle relation to the lever E serves rapidly to complete the movement of the lever E, after the toggle has passed through the point of greatest compression of the spring M. The spring also offsets any tendency that the lever E may have to return to its former position, such movement being impossible unless a reversal of the shaft D thrusts the auxiliary lever F in the opposite direction, in which case the lever E is operated as has already been described. As long as the shaft continues to rotate in one direction the frictional force existing between it and the member P¹, P², is sufficient to hold the lower end L of the lever F outside the path of travel of the projection K.

The spring M not only provides for the rapid completion of the throw of the lever E, but also gives it more extended movement than would result simply from the positive action of the projection K upon the lever F. This extended movement makes certain that no accidental return movement of the auxiliary member F will be of sufficient scope to bring the end L into contact with the projection K.

It will thus be seen that there is provided a device in which the various objects of this invention are achieved and that the same is well adapted to meet the hardest conditions of practical use.

As many possible embodiments may be made of the above invention and as many changes might be made in the embodiment above set forth, it is to be understood that all matter hereinbefore set forth or shown in the accompanying drawings is to be considered as illustrative and not in a limiting sense.

What I claim as new and desire to secure by Letters Patent is:

1. In mechanism of the character described, in combination, a rotatably mounted shaft, means the position of which is to be reversed in accordance with the direction of rotation of said shaft, a member having connection with said means and adapted upon actuation to move said means, means driven by said shaft adapted to actuate said member, and means comprising a movable frame having three point frictional contact with said shaft and connected with said member for positioning it for actuation by said driven means.

2. In mechanism of the character described, in combination, a rotatably mounted shaft, means the position of which is to be reversed in accordance with the direction of rotation of said shaft, a member having connection with said means and adapted upon actuation to move said means, means driven by said shaft adapted to actuate said member, an annular groove formed upon the periphery of said shaft, movable means having frictional contact with said shaft at a plurality of points within said annular groove, and means connecting said member and said movable means.

3. In mechanism of the character described, in combination, a rotatably mounted shaft, means the position of which is to be reversed in accordance with the direction of rotation of said shaft, a member having connection with said means and adapted upon actuation to move said means, means driven by said shaft adapted to actuate said member, a movable frame having a plurality of friction surfaces in contact with said shaft, a spring for causing said surfaces to engage said shaft with substantially uniform pressure, and means connecting said frame to said member to move the latter to a position where it may be actuated by said driven means.

4. In mechanism of the character described, in combination, a shaft, means adapted to be moved to alternative positions upon reversal of the direction of rotation of said shaft, a member adapted to move said means, shaft driven means adapted to actuate said member, a frame comprising an upper portion and a lower portion pivoted to said upper portion, a spring tending to draw said frame portions together about said shaft, a pair of spaced friction shoes located in said upper portion, a friction shoe in said lower portion disposed symmetrically with respect to said upper shoes, and means on said upper portion also disposed symmetrically with respect to said upper shoes for positioning said member for actuation by said driven means.

5. In mechanism of the character described, in combination, a shaft, means adapted to be moved to alternative positions upon reversal of the direction of rotation of said shaft, a member adapted to move said means, shaft driven means adapted to actuate said member, and means responsive to the direction of rotation of said shaft and having a pin and slot connection with said member for moving said member to a position where it may be actuated by said driven means.

6. In mechanism of the character described, in combination, a rotatably mounted shaft, means the position of which is to be reversed in accordance with the direction of rotation of said shaft, a member having connection with said means and adapted upon actuation to move said means, a projection upon said shaft adapted to actuate said member and means responsive to the direction of rotation of said shaft and having pin and slot connection with said member for positioning said member in the path of rotation of said projection.

7. In mechanism of the character described, in combination, a rotatably mounted shaft, a lever the position of which is to be reversed in accordance with the direction of rotation of said shaft, a member having connection with said means and adapted upon actuation to move said lever, means driven by said shaft adapted to actuate said member, and means responsive to the direction of rotation of said shaft and having pin and slot connection with said member for positioning said member for actuation by said driven means.

8. In mechanism of the character described, in combination, a rotatably mounted shaft, means the position of which is to be reversed in accordance with the direction of rotation of said shaft, a member having connection with said means and adapted upon actuation to move said means, means driven by said shaft adapted to actuate said member, means responsive to the direction of rotation of said shaft and having pin and slot connection with said member for positioning said member for actuation by said driven means, and means for completing the reversal of said first means.

9. In mechanism of the character described, in combination, a rotatably mounted shaft, means the position of which is to be reversed in accordance with the direction of rotation of said shaft, a member having connection with said means and adapted upon actuation to move said means, means driven by said shaft adapted to actuate said member, means responsive to the direction of rotation of said shaft and having pin and slot connection with said member for positioning said member for actuation by said driven means, and resilient means for completing the reversal of said first means.

10. In mechanism of the character described, in combination, a shaft, means adapted to be moved to alternative positions upon reversal of the direction of rotation of said shaft, a member adapted to move said means, shaft driven means adapted to actuate said member, means responsive to the direction of rotation of said shaft and having a pin and slot connection with said member for moving said member to a position where it may be actuated by said driven means, and resilient means for completing the reversal of said first means.

11. In mechanism of the character described, in combination, a rotatably mounted shaft, a lever the position of which is to be reversed in accordance with the direction of rotation of said shaft, a member having connection with said means and adapted upon actuation to move said means, means driven by said shaft adapted to actuate said member, means responsive to the direction of rotation of said shaft and having pin and slot connection with said member for positioning said member for actuation by said driven means, and a spring attached in toggle fashion to said lever for quickly completing the reversal of said first means.

12. In mechanism of the character described, in combination, a lever pivoted to swing between two fixed points of rest, a second lever mounted to have limited movement relatively to said first lever, a rotative shaft, a friction device comprising a frame frictionally floating upon said shaft, means connecting said friction device with said second lever to impart limited motion thereto upon reversal of the direction of rotation of said shaft, and means upon said shaft adapted positively to engage said second lever to cause a continuation of the movement of said lever, whereby motion is imparted to said first lever to swing the latter from one of its fixed points of rest toward the other thereof.

13. In mechainsm of the character described, in combination, a lever pivoted to swing between two fixed points of rest, a second lever mounted to have limited movement relatively to said first lever, a rotative shaft, a friction device comprising a frame frictionally floating upon said shaft, means connecting said friction device with said second lever to impart limited motion thereto upon reversal of the direction of rotation of said shaft, means upon said shaft adapted positively to engage said second lever to cause a continuation of the movement of said lever, whereby motion is imparted to said first lever to swing the latter from one of its fixed points of rest toward the other thereof, and resilient means for causing a rapid completion of the movement of said first lever.

In testimony whereof I have affixed my signature.

HUGO GROB.